United States Patent
Novotny et al.

(10) Patent No.: US 7,362,804 B2
(45) Date of Patent: Apr. 22, 2008

(54) GRAPHICAL SYMBOLS FOR H.264 BITSTREAM SYNTAX ELEMENTS

(75) Inventors: Pavel Novotny, Waterloo (CA); Guy Cote, Elora (CA); Lowell L. Winger, Waterloo (CA); Simon Booth, Milton (CA)

(73) Assignee: LSI Logic Corporation, Milpitas, CA (US)

( * ) Notice: Subject to any disclaimer, the term of this patent is extended or adjusted under 35 U.S.C. 154(b) by 911 days.

(21) Appl. No.: 10/720,783

(22) Filed: Nov. 24, 2003

(65) Prior Publication Data

US 2005/0123282 A1   Jun. 9, 2005

(51) Int. Cl.
*H04N 7/12* (2006.01)
*G06F 3/01* (2006.01)

(52) U.S. Cl. .......................... 375/240.01; 375/240.25; 715/716

(58) Field of Classification Search .......... 375/240.01, 375/240.25; 348/563, 564, 565; 725/40, 725/43; 382/232; 715/716
See application file for complete search history.

(56) References Cited

U.S. PATENT DOCUMENTS

| | | | |
|---|---|---|---|
| 6,011,868 A * | 1/2000 | van den Branden et al. | 382/233 |
| 6,525,746 B1 * | 2/2003 | Lau et al. | 715/725 |
| 6,532,024 B1 * | 3/2003 | Everett et al. | 715/716 |
| 6,727,915 B2 * | 4/2004 | Coleman et al. | 715/744 |
| 6,948,127 B1 * | 9/2005 | Zhu et al. | 715/719 |

\* cited by examiner

*Primary Examiner*—Gims Philippe
*Assistant Examiner*—Erick Rekstad
(74) *Attorney, Agent, or Firm*—Christopher P. Maiorana, P.C.

(57) ABSTRACT

An apparatus comprising a first circuit and a second circuit. The first circuit may be configured to generate a decoded video signal and syntax elements in response to an encoded bitstream. The second circuit may be configured to generate one or more overlay images in response to the syntax elements. The overlay images generally comprise graphical symbols representing the syntax elements of the encoded bitstream.

22 Claims, 13 Drawing Sheets

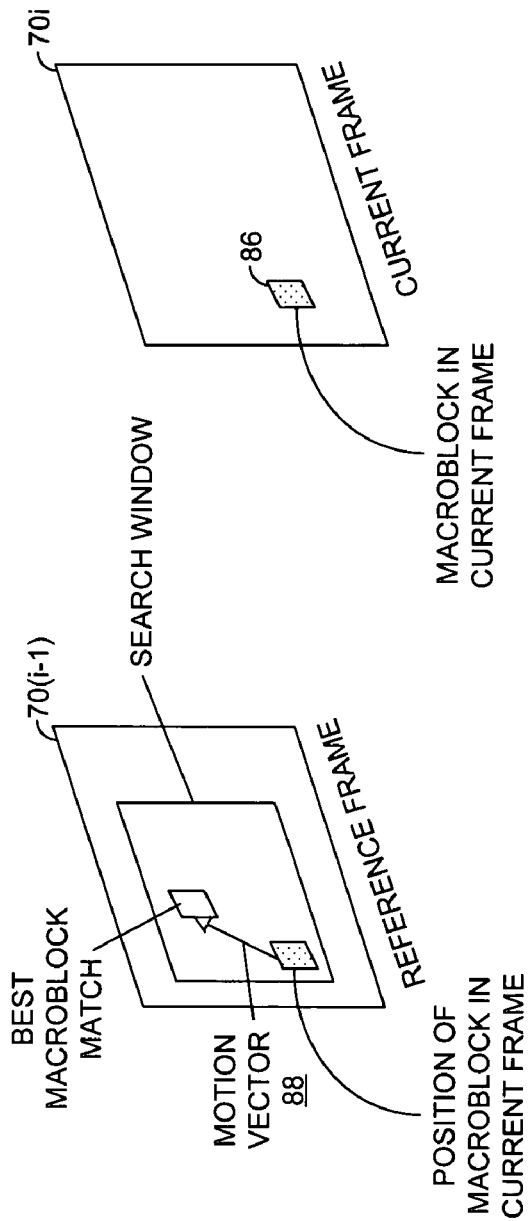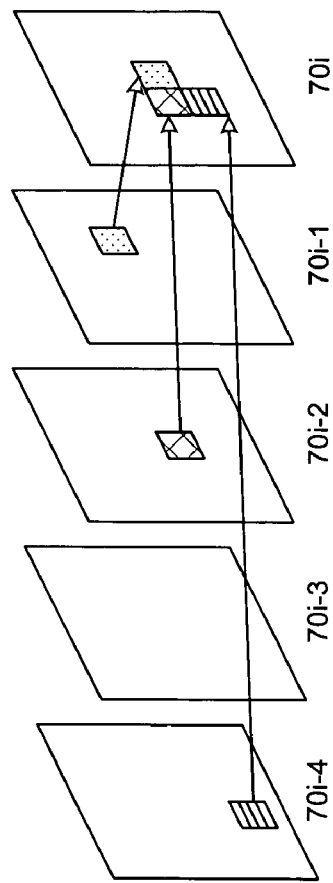
FIG. 2

| | INTRA 16x16 | (WHITE) |
|---|---|---|
| | INTRA 4x4 | (WHITE) |
| | SKIP | (TRANSPARENT WITH A RED BORDER) |
| | LIST0 16x16 | |
| | LIST1 16x16 | |
| | LIST0 LIST1 16x16 | |
| | DIRECT 16x16 | (LIGHT GREEN) |
| | PCM | (YELLOW) |
| | LIST0 16x8 | |
| | LIST0 8x16 | |
| | 8x16 BLOCK:LEFT LIST0 LIST1, RIGHT LIST1 | |
| | SUB-PARTITION: TOP-LEFT | LIST0 8x8 |
| | TOP-RIGHT | LIST0 LIST1 4x4 |
| | BOTTOM-LEFT | LIST1 4x8 |
| | BOTTOM-RIGHT | DIRECT 8x8 (LIGHT GREEN) |
| •———— | FORWARD MOTION VECTORS (RED) | |
| •———— | BACKWARD MOTION VECTORS (BLUE) | |

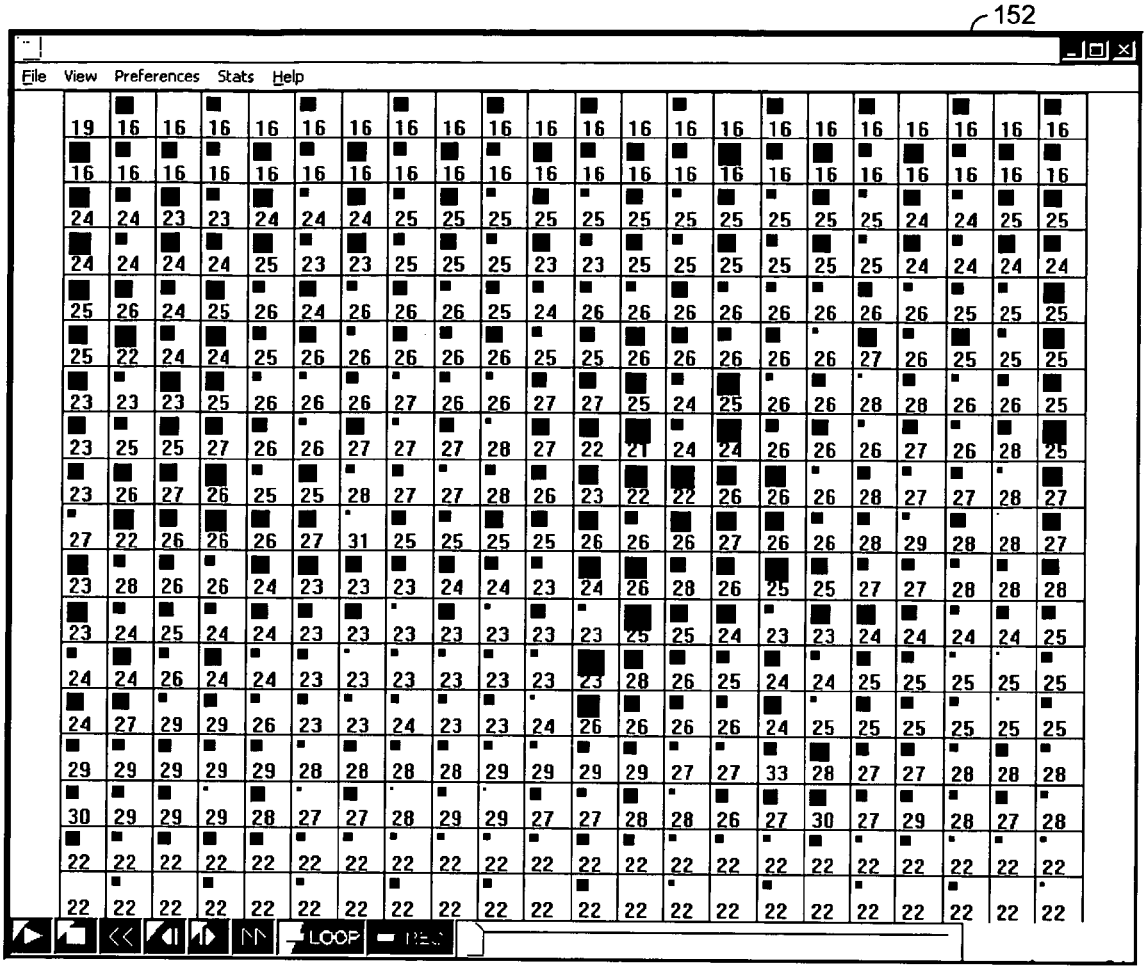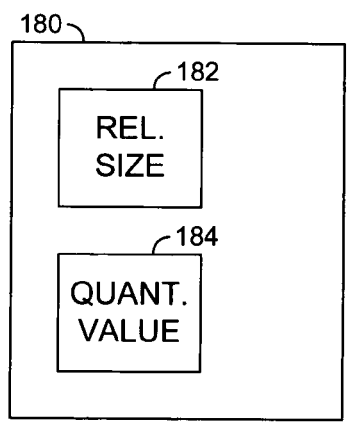
FIG. 10

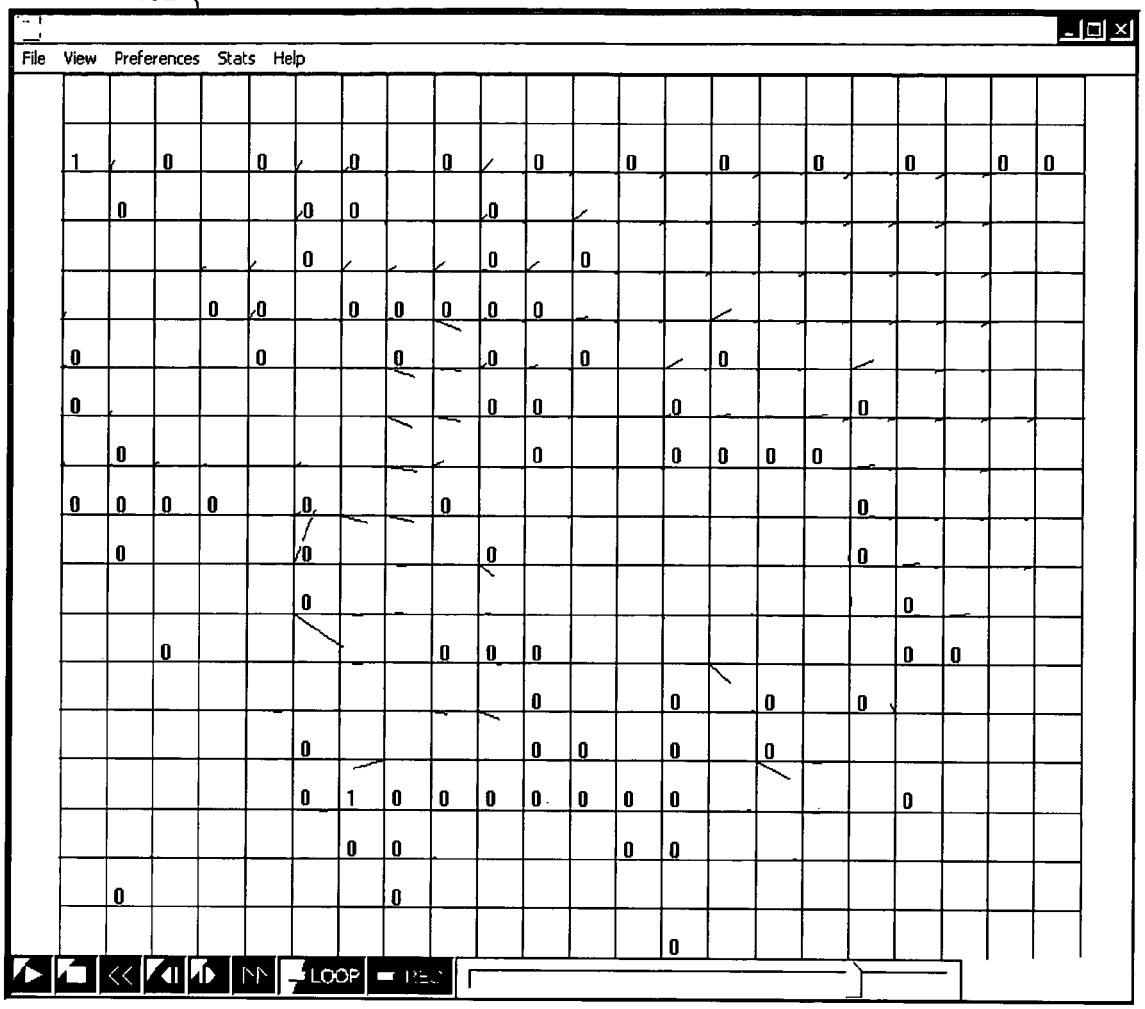
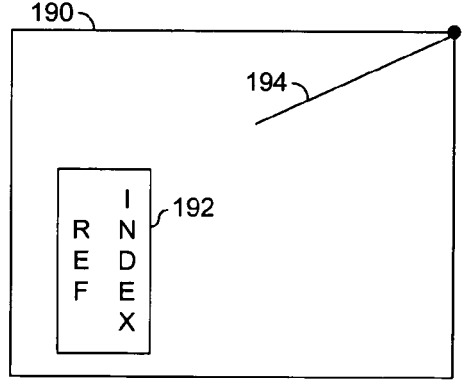
FIG. 11

158
| Luma | | | | | | | | | | | | | | | | Chroma | | | | | | | |
|---|---|---|---|---|---|---|---|---|---|---|---|---|---|---|---|---|---|---|---|---|---|---|---|
| 23 | 23 | 23 | 23 | 24 | 24 | 24 | 24 | 24 | 11 | 77 | 155 | 164 | 153 | 147 | 155 | 128 | 128 | 128 | 130 | 136 | 138 | 138 | 140 |
| 23 | 23 | 23 | 23 | 24 | 24 | 24 | 24 | 21 | 17 | 86 | 157 | 163 | 150 | 148 | 156 | 128 | 127 | 127 | 129 | 137 | 139 | 139 | 140 |
| 23 | 23 | 23 | 23 | 24 | 24 | 24 | 24 | 15 | 31 | 104 | 162 | 159 | 149 | 149 | 155 | 128 | 127 | 127 | 129 | 137 | 139 | 139 | 140 |
| 23 | 23 | 23 | 23 | 24 | 24 | 24 | 24 | 14 | 38 | 114 | 166 | 156 | 149 | 150 | 152 | 128 | 127 | 127 | 129 | 137 | 139 | 139 | 140 |
| 23 | 23 | 23 | 23 | 24 | 24 | 24 | 24 | 15 | 51 | 127 | 167 | 154 | 149 | 151 | 152 | 128 | 127 | 127 | 129 | 137 | 139 | 139 | 140 |
| 23 | 23 | 23 | 23 | 24 | 24 | 24 | 24 | 15 | 59 | 135 | 167 | 152 | 152 | 152 | 152 | 128 | 127 | 127 | 129 | 137 | 139 | 139 | 140 |
| 23 | 23 | 23 | 23 | 24 | 25 | 24 | 23 | 16 | 75 | 151 | 168 | 150 | 152 | 153 | 153 | 128 | 127 | 127 | 129 | 137 | 139 | 139 | 140 |
| 23 | 23 | 23 | 23 | 24 | 26 | 24 | 21 | 16 | 83 | 159 | 168 | 150 | 152 | 153 | 153 | 128 | 128 | 128 | 131 | 137 | 140 | 140 | 141 |
| 23 | 23 | 23 | 23 | 25 | 26 | 25 | 20 | 32 | 113 | 170 | 170 | 151 | 153 | 153 | 153 | 127 | 127 | 127 | 126 | 125 | 120 | 112 | 111 |
| 23 | 23 | 23 | 23 | 25 | 27 | 25 | 18 | 49 | 127 | 166 | 158 | 151 | 152 | 153 | 153 | 127 | 126 | 126 | 125 | 124 | 119 | 111 | 110 |
| 23 | 23 | 23 | 23 | 25 | 29 | 24 | 17 | 63 | 148 | 173 | 153 | 151 | 152 | 152 | 152 | 127 | 126 | 126 | 125 | 124 | 119 | 111 | 110 |
| 23 | 23 | 23 | 23 | 25 | 31 | 22 | 17 | 80 | 152 | 180 | 160 | 152 | 152 | 152 | 152 | 127 | 126 | 126 | 125 | 124 | 119 | 111 | 110 |
| 23 | 23 | 23 | 23 | 24 | 32 | 17 | 22 | 85 | 170 | 166 | 149 | 152 | 152 | 152 | 152 | 127 | 126 | 126 | 125 | 124 | 119 | 111 | 110 |
| 23 | 23 | 24 | 24 | 26 | 31 | 17 | 28 | 110 | 172 | 159 | 147 | 152 | 152 | 152 | 152 | 127 | 126 | 126 | 125 | 124 | 119 | 111 | 110 |
| 23 | 23 | 24 | 25 | 27 | 31 | 18 | 41 | 135 | 174 | 152 | 145 | 152 | 152 | 152 | 152 | 127 | 126 | 126 | 125 | 124 | 119 | 111 | 110 |
| 23 | 23 | 24 | 25 | 27 | 30 | 19 | 48 | 137 | 167 | 151 | 149 | 152 | 152 | 152 | 152 | 127 | 126 | 125 | 123 | 122 | 117 | 110 | 109 |
FIG. 13
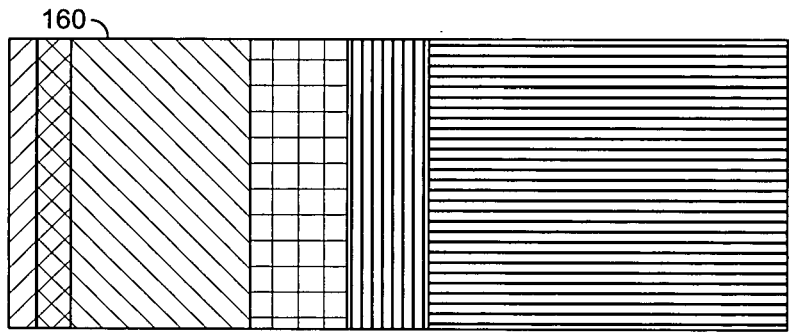
FIG. 14
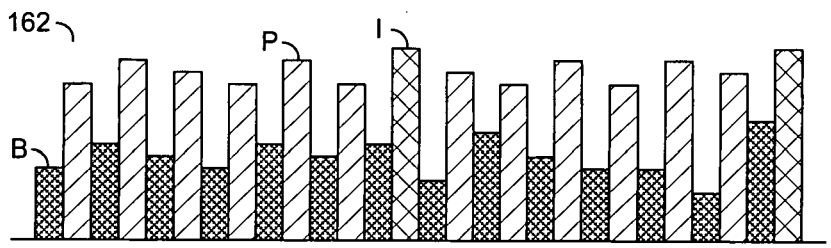
FIG. 15

GRAPHICAL SYMBOLS FOR H.264 BITSTREAM SYNTAX ELEMENTS

FIELD OF THE INVENTION

The present invention relates to video generally and, more particularly, to graphical symbols for H.264 bitstream syntax elements.

BACKGROUND OF THE INVENTION

H.264 (also called MPEG-4 part 10) is an emerging video coding standard. Because the syntax of an H.264 bitstream is significantly more complex than any other previous video coding standard, such as MPEG-2 or MPEG-4 part 2, existing approaches for visualizing bitstream elements cannot be used. An existing implementation of an H.264 decoder published by the MPEG group (called the JM code) has trace file functionality. The trace file functionality produces a text file containing information about the syntax elements of the bitstream. Because the trace file generated by the JM code is in a text format, working with the information can be very difficult. Correlating the bitstream syntax elements in the text file with the decoded video for verifying that specific syntax elements were used at specific locations in the decoded video can be especially difficult.

A solution that allows correlation of H.264 bitstream syntax elements with specific locations in the decoded video would be desirable.

SUMMARY OF THE INVENTION

The present invention concerns an apparatus comprising a first circuit and a second circuit. The first circuit may be configured to generate a decoded video signal and syntax elements in response to an encoded bitstream. The second circuit may be configured to generate one or more overlay images in response to the syntax elements. The overlay images generally comprise graphical symbols representing the syntax elements of the encoded bitstream.

The objects, features and advantages of the present invention include providing graphical symbols for H.264 bitstream syntax elements that may (i) use simple color coded symbols to display bitstream syntax elements, (ii) overlay the symbols on the decoded video, (iii) simultaneously display both decoded video and the associated bitstream syntax elements, (iv) use different shapes and/or colors to express bitstream elements, and/or (v) be used with previous and future encoding formats.

BRIEF DESCRIPTION OF THE DRAWINGS

These and other objects, features and advantages of the present invention will be apparent from the following detailed description and the appended claims and drawings in which:

FIG. 2 is a block diagram illustrating example prediction operations;

FIG. 8 is a block diagram illustrating various examples of graphic symbols in accordance with a preferred embodiment of the present invention;

FIG. 10 is an example display illustrating an overlay comprising graphic symbols representing macroblock size and macroblock quantization parameter information;

FIG. 11 is an example display illustrating an overlay comprising graphic symbols representing motion vectors and reference indices;

FIG. 13 is a diagram illustrating an example display format for reporting pixel values;

FIG. 14 is a more detailed block diagram illustrating an example of a macroblock histogram of FIG. 6; and FIG. 15 is a more detailed block diagram illustrating an example of a group of pictures histogram of FIG. 6.

DETAILED DESCRIPTION OF THE PREFERRED EMBODIMENTS

Figure 1:
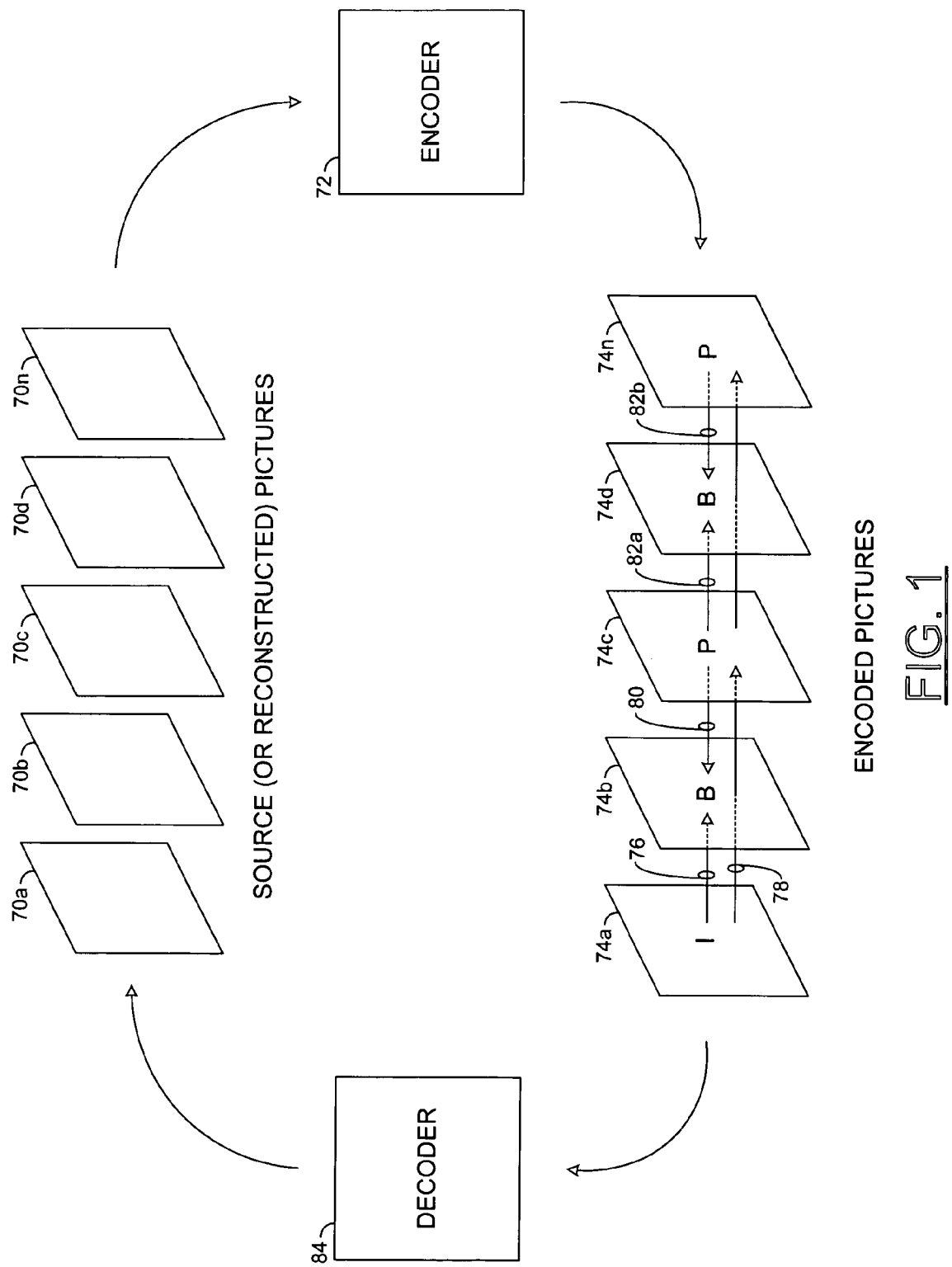
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures 70a-n. The source pictures may also be referred to as images, frames, a group-of-pictures (GOP) or a sequence. The pictures generally comprise contiguous rectangular arrays of pixels (i.e., picture elements). Compression of digital video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psycho-visual redundancy, due to properties of the human visual system (HVS).

Video frames generally comprise three rectangular matrices of pixel data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures 70*a-n* may be presented to an encoder 72. The encoder 72 may be configured to generate a series of encoded pictures 74*a-n* in response to the source pictures 70*a-n*, respectively. For example, the encoder 72 may be configured to generate the encoded pictures 74*a-n* using a compression standard (e.g., MPEG-2, MPEG-4, H.264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 74*b* and the P-picture 74*c* may be predicted using the I-picture 74*a* (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82*a* and 82*b*, respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is generally not time, but rather how many frames are stored in a buffer so that the frames may be decoded in a different order than the frames are displayed. In one example, the frames may be referenced forward in time. In another example, the frames may be referenced backward in time (e.g., re-ordering the frames).

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264. In many cases an important distinction is between reference and non-reference frames.

The encoded pictures 74*a-n* may be presented to a decoder 84. The decoder 84 is generally configured to generate a series of reconstructed pictures corresponding to the source pictures 70*a*-70*n* (e.g., images, frames, fields, etc.) in response to the encoded pictures. In one example, the decoder 84 may be implemented within the encoder 72 and the reconstructed pictures may be used in the prediction operations of the encoding process.

Referring to FIG. 2, a block diagram is shown illustrating example prediction operations. A picture (or video frame) 70*i* may be divided into a number of macroblocks 86 of equal size. In one example, the macroblocks 86 may be implemented as 16×16 pixels. However, other size macroblocks may be implemented to meet the design criteria of a particular application. Motion compensated prediction generally presumes that a macroblock within the current picture 70*i* may be modeled as a translation of a macroblock from a picture 70(*i*−1). Each macroblock 86 in the current picture 70*i* may be predicted from the reference picture 70(*i*−1). The motion information is generally represented as a two-dimensional displacement vector or motion vector 88. Due to the block-based picture representation, motion estimation generally uses block-matching techniques that obtain the motion vector by minimizing a cost function measuring the mismatch between a candidate block and the current block. In one example, a number of reference pictures 70(*i*−4), 70(*i*−3) . . . 70(*i*−1) may be used to predict the macroblocks in the current picture 70*i*.

Figure 3:
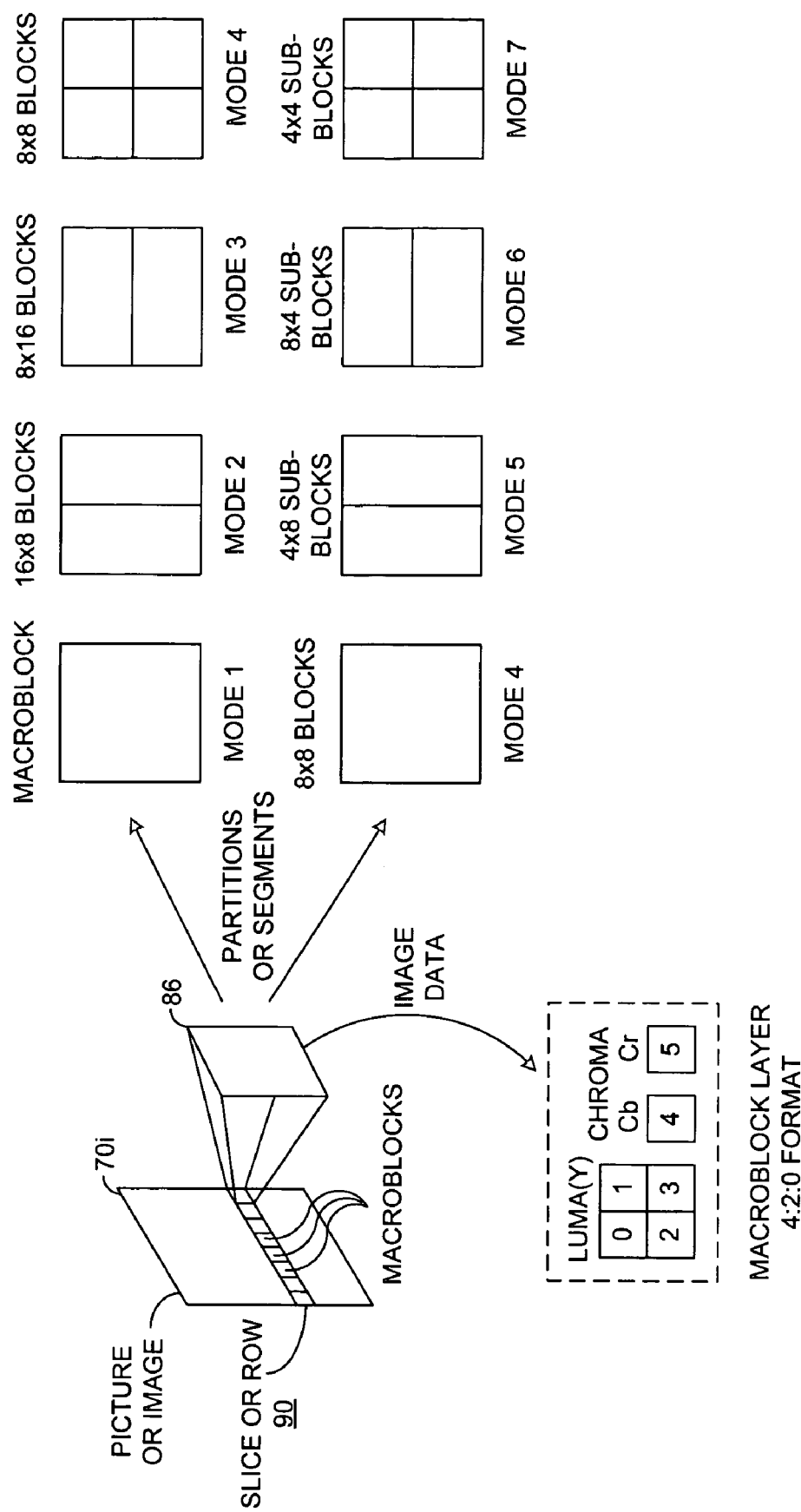
FIG. 3 is a block diagram illustrating partitions or segments of pictures.

Referring to FIG. 3, a block diagram is shown generally illustrating partitions or segments of pictures. In general, a picture (e.g., an image, a frame, a field, etc.) 70*i* may be divided (e.g., segmented, partitioned, etc.) into a number of macroblocks 86. The macroblocks generally comprise an array of pixels having vertical and horizontal dimensions of equal size (e.g., 32×32, 16×16, etc). The macroblocks generally comprise luminance data (e.g., luma Y) and chrominance data (e.g., blue chroma Cb and red chroma Cr). In one example, the luminance data may have a resolution that is twice that of the chrominance data (e.g., a 4:2:0 format).

The macroblocks 86 may be grouped in a number of slices 90. The slices 90 may comprise an arbitrary number of macroblocks 86. The slices 90 generally run from left to right and may comprise an entire row of the picture 70*i*. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. The macroblock 86 may be encoded in an inter prediction mode (e.g., compression based upon temporal redundancy) or an intra prediction mode (e.g., compression based upon spatial redundancy). In the inter prediction mode, each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

For chrominance (or chroma) samples, the prediction block is generally formed for the entire 8×8 chroma block. Both chroma Cb and chroma Cr blocks are generally processed similarly. In general, one of four prediction modes may be used (e.g., DC or mode 0, vertical or mode 1, horizontal or mode 2, and plane or mode 3).

Figure 4:
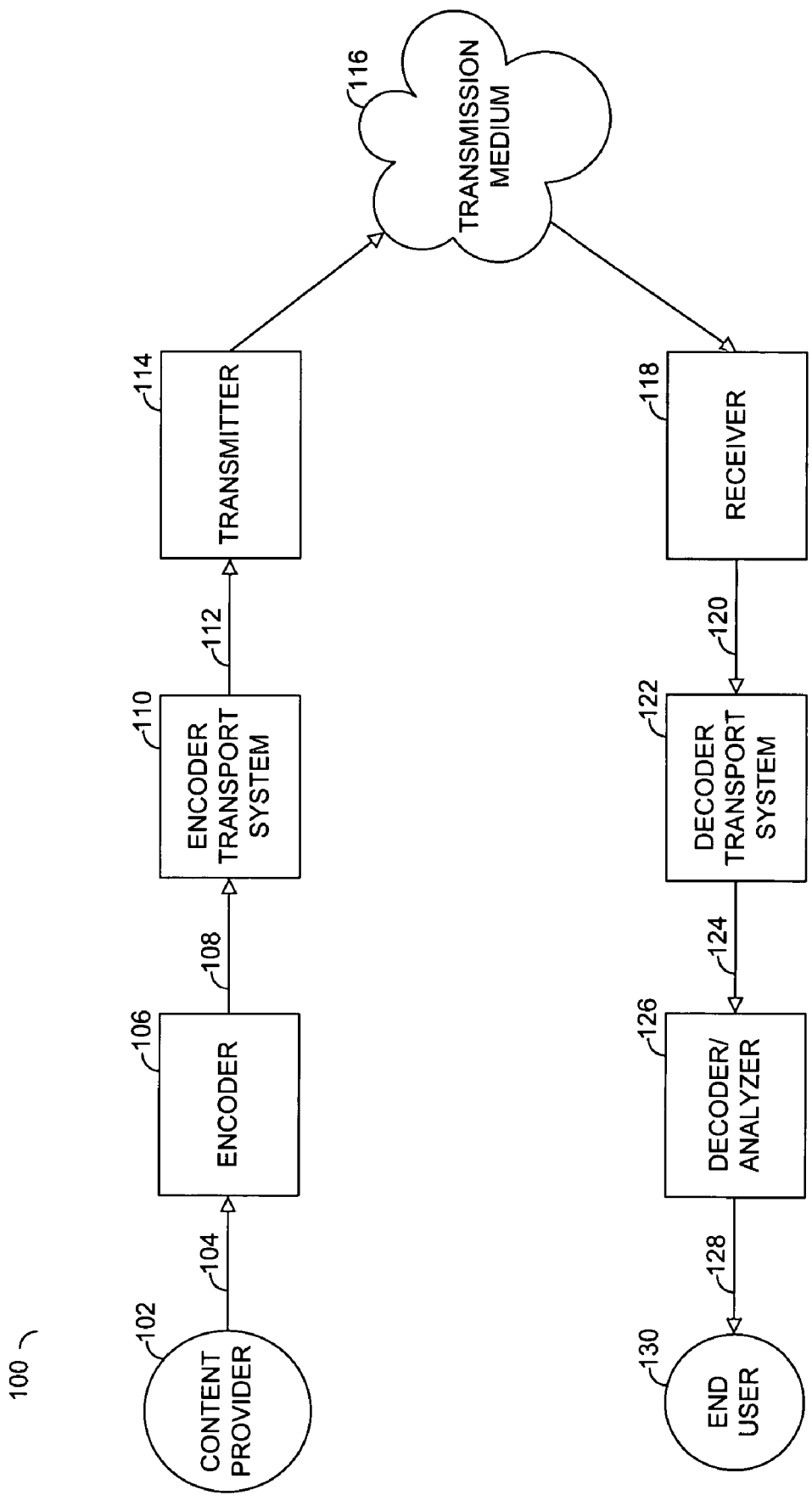
FIG. 4 is a block diagram illustrating various components of a compressed video system in accordance with a preferred embodiment of the present invention.

Referring to FIG. 4, a block diagram of a system 100 in accordance with a preferred embodiment of the present invention is shown. In general, a content provider 102 presents video image, audio or other data 104 to be compressed and transmitted to an input of an encoder 106. The compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bitstream.

On a receiving side of the system 100, a receiver 118 generally receives the compressed data bitstream from the transmission medium 116. The receiver 118 presents an encoded bitstream 120 to a decoder transport system 122. The decoder transport system 122 generally presents the encoded bitstream via a link 124 to a decoder/analyzer 126. The decoder/analyzer 126 generally decompresses (decodes) the data bitstream and presents the data via a link 128 to an end user 130. The decoder/analyzer 126 is generally configured to also present information (e.g., a number of overlays that may include graphic symbols) regarding bitstream syntax elements via the link 128. The end user 130 may comprise a television, a monitor, a computer, a projector, a hard drive, or any other medium implemented to carry, transfer, present, display and/or store the uncompressed bitstream (decoded video signal) and/or information regarding the bitstream syntax elements.

The present invention generally provides a graphical display of syntax elements as well as other bitstream parameters and statistics overlaid upon the decoded video frames. Each encoded picture generally consists of 16×16 blocks of pixel data called macroblocks. However, other size macroblocks may be implemented accordingly to meet the design criteria of a particular application. The present invention generally overlays macroblock syntax elements that may include but are not limited to: macroblock type, sub-macroblock types and prediction directions; macroblock encoded size; macroblock quantization parameter; macroblock reference index; macroblock motion vectors; macroblock adaptive field/frame (MBAFF) structure; macroblock pixel values; macroblock frequency coefficients. In addition to the macroblock variables, a macroblock type histogram and a macroblock grid may also be overlaid. In general, the present invention facilitates the correlation of the macroblock syntax elements to the video content by presenting the bitstream syntax information in such a manner that the information may be displayed over the corresponding decoded video.

Figure 5:
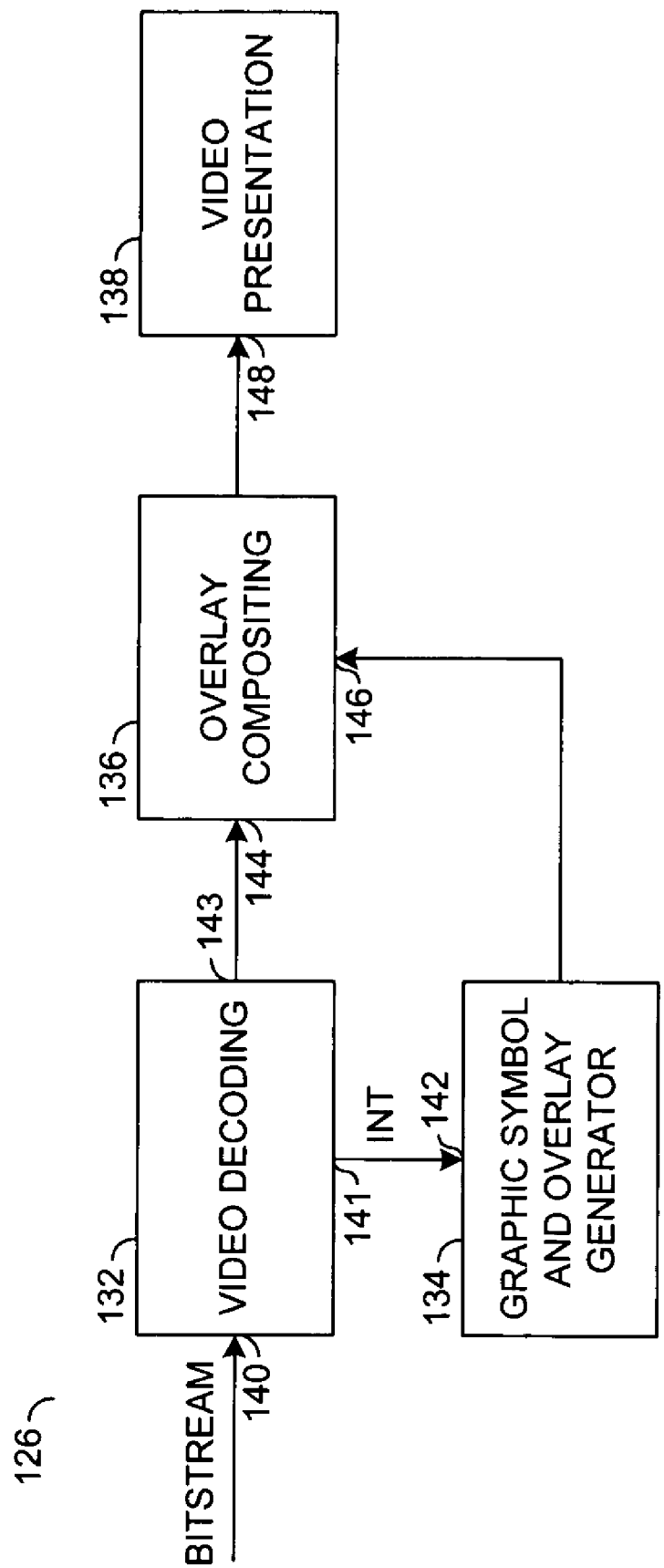
FIG. 5 is a more detailed block diagram illustrating an example decoder/analyzer of FIG. 4 in accordance with a preferred embodiment of the present invention.

Referring to FIG. 5, a more detailed block diagram illustrating an example decoder/analyzer 126 of FIG. 4 in accordance with a preferred embodiment of the present invention is shown. The decoder/analyzer (or circuit) 126 may be configured to decode an encoded bitstream (e.g., BITSTREAM). In one example, the signal BITSTREAM may comprise an H.264 compliant video bitstream and the circuit 126 may be implemented as an H.264 decoder/analyzer. The circuit 126 may be configured to generate a decoded video signal and one or more overlay images (e.g., graphical displays) comprising information about syntax elements contained in the encoded bitstream. The circuit 126 may comprise a block (or circuit) 132, a block (or circuit) 134, a block (or circuit) 136 and a block (or circuit) 138. The block 132 may be implemented, in one example, as a video decoding circuit. The block 134 may be implemented, in one example, as a graphic symbol and overlay generator. The block 136 may be implemented as an overlay compositing block. The block 138 may be implemented as a video presentation block.

The signal BITSTREAM may be presented to an input 140 of the block 132. The block 132 may be configured to decode video information from the signal BITSTREAM. The circuit 132 may have an output 141 that may present syntax elements and information extracted from the signal BITSTREAM to an input 142 of the block 134 (e.g., as one or more signals INT) and an output 143 that may present a decoded video signal to an input 144 of the block 136. The block 134 may be configured to generate a number of overlay images comprising graphic symbols representing syntax elements in the encoded bitstream BITSTREAM. The block 134 may be further configured to generate a number of statistics with respect to the syntax elements of the signal BITSTREAM. The block 134 may be configured to present the graphic symbols representing the syntax elements and the statistics regarding the encoded bitstream in the one or more graphic overlay images (or windows) to an input 146 of the block 136.

The block 136 may be configured to generate a composited video image in response to the decoded video signal from the block 132 and the one or more overlay images from the block 134. The block 136 may be configured to present a signal comprising the composited video image to an input 148 of the block 138. The block 138 may be configured to present the composited video signal to a user of the decoder/analyzer 126.

Figure 6:
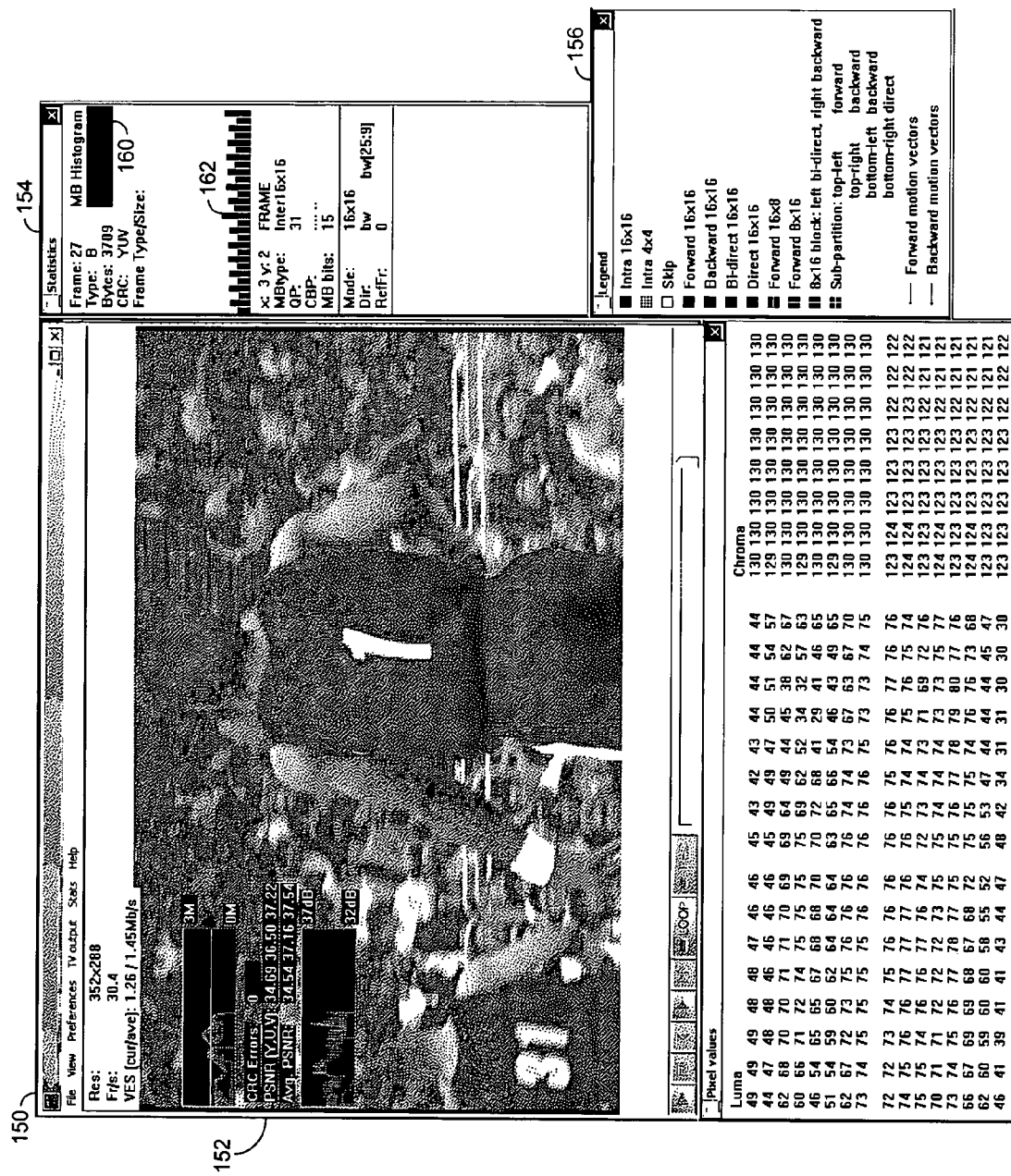
FIG. 6 is an example display illustrating a decoded video display and various analysis tools.

Referring to FIG. 6, an example display 150 is shown illustrating an example output of the circuit 126 with analyzer tools turned on. The display 150 generally illustrates a graphical user interface (GUI) in accordance with a preferred embodiment of the present invention. In an analyzing mode, the display 150 may comprise a main window 152, a statistics window 154, a legend window 156 and a pixel values window 158. However, other windows may be implemented accordingly to meet the design criteria of a particular application.

The decoded video is generally presented in the main window 152. The main window 152 may also be configured to display corresponding bitstream syntax elements overlaid on the decoded video. By overlaying the bitstream syntax elements directly on the corresponding decoded video, the present interface provides visual correlation between the syntax elements and specific locations in the decode video.

The statistics window 154 may be implemented (e.g., in the upper right corner) to display picture level parameters and statistics (e.g., a macroblock histogram 160, a group-of-pictures histogram 162, picture type/size, etc.) as well as some detailed macroblock level parameters about a macroblock selected by, for example, a mouse pointer. The parameters may include coordinates of the selected macroblock within the picture. When macroblock level adaptive frame/field (MBAFF) coding is enabled, each macroblock pair may be coded in a frame or field mode. A string (e.g., "FRAME") may be displayed in the window 154 for macroblocks encoded in the frame mode. For macroblocks encoded in the field mode, a different string for top or bottom macroblocks may be displayed. For example, top macroblocks (e.g., even vertical position) may be indicated by a string "TOP_FIELD" and bottom macroblocks (e.g., odd vertical position) may be indicated by a string "BOTTOM_FIELD".

The legend window 156 may be displayed (e.g., in the bottom right corner) to provide a description of the on-screen graphical symbols presented in the overlay image in the window 152. The window 158 may be implemented to enumerate the pixel values (e.g., luma and chroma) of the selected macroblock.

When the macroblock statistics described above are rendered over the decoded video picture, a grid (illustrated in FIGS. 9-12 below) representing the macroblocks of the decoded video may be displayed in the window 152 to highlight the macroblock boundaries (e.g., 16×16 pixels, etc.) with a thin line. The macroblock grid generally renders the information relevant to each macroblock inside the respective macroblock area (described in more detail in connection with FIGS. 9-12 below). The macroblock grid generally provides the user with visual correlatation between the macroblock parameters and the decoded video.

Figure 7:
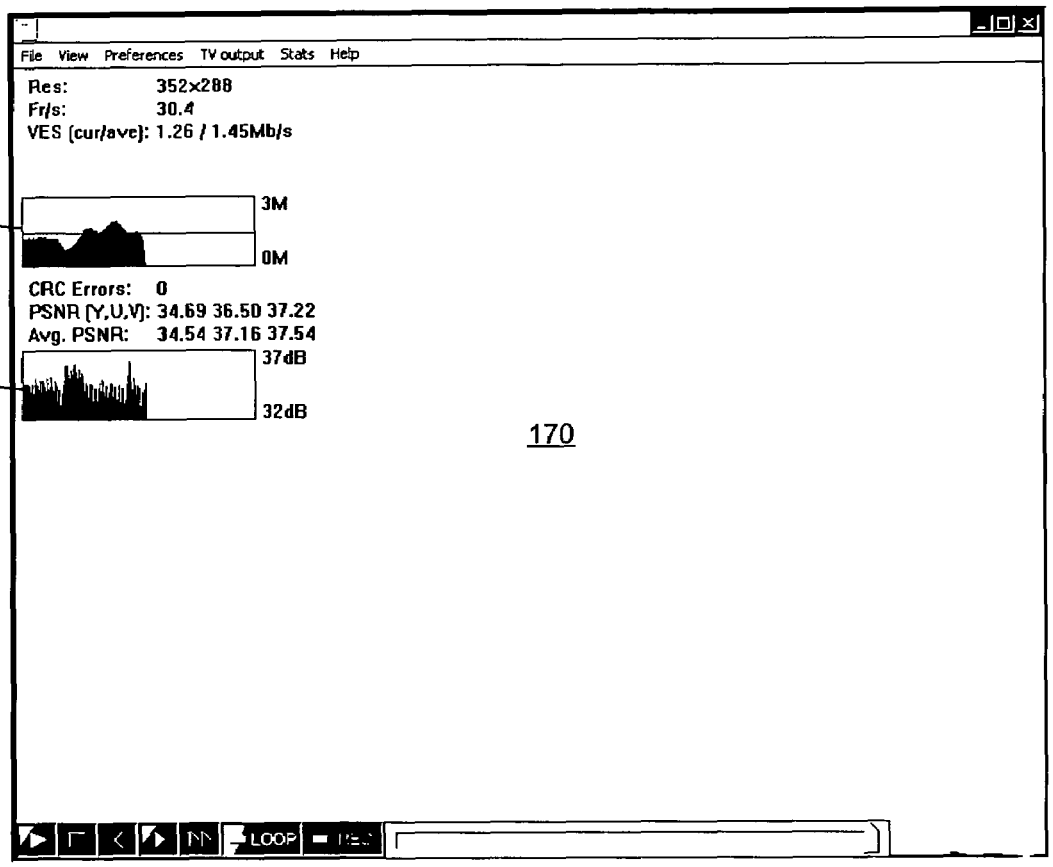
FIG. 7 is an example display illustrating a high-level on-screen statistics overlay in accordance with a preferred embodiment of the present invention.

Referring to FIG. 7, an overlay display 170 is shown illustrating an example high-level on-screen statistics overlay. In one example, the present invention may provide a graphic user interface (GUI) for the decoder/analyzer 126. The GUI may provide information to the user at a number of different levels. In one example, the circuit 126 may be configured to display decoded video only, in which case the circuit 126 does not generally provide detailed information about the encoded bitstream to the user. In another example, the circuit 126 may be configured to display high level information about the decoded video signal such as video resolution, frame rate, and bit rates. The circuit 126 may be configured to also display low-level bitstream syntax elements.

In one example, a GUI in accordance with the present invention may be configured to display high-level video statistics as an overlay on the decoded video in the main window 152 (e.g., in the top-left corner, etc.). The displayed statistics may include, but are not limited to: resolution, frame rate, bit rate, a bit rate graph 172, bitstream errors, peak signal to noise ratio (PSNR), average PSNR and a PSNR graph 174. Other statistics may be displayed accordingly to meet the design criteria of a particular application. In one example, the resolution of the decoded video in pixels may be displayed in a width×height format. The frame rate may be displayed as the actual frame rate (e.g., in frames per second).

The bit rate statistic may comprise a current and/or average bit rate (e.g., in megabits per second). For an MPEG-2 transport stream, all three video/audio and transport bit rates may be displayed. The bit rate graph 172 may be configured, in one example, to display a time history of the bit rate of the signal BITSTREAM. For example, the time may be represented on one axis (e.g., the horizontal scale) and the bit rate may be displayed on another axis (e.g., the vertical scale). In one example, the vertical bit rate scale may be dynamically adjusted. When the current bit rate value exceeds a maximum value of the graph, the maximum value of the graph may be increased, in one example, to a next higher integer number of megabits. The vertical scale of the graph 172 may be configured to indicate the maximum bit rate reached since the decoder was started. In one example, the bit rate graph 172 may be color coded. For example, the video bit rate may be displayed in the color blue, the audio bit rate in light green and the total bit rate in brown. However, other colors may be employed accordingly to meet the design criteria of a particular application. A thin horizontal line may be implemented across the graph 172 to indicate the average bit rate.

The errors value generally indicates a number of incorrectly decoded pictures. The error statistic may be implemented similarly to a CRC. However, other types of errors may be tracked and displayed accordingly. The PSNR display may comprise the current PSNR(Y, U, V) and an average PSNR in decibels (dB) for the decoded video. In one example, the Y, U and V channels may be displayed separately. The PSNR graph 174 may be configured to display a time history of the luminance PSNR. For example, the time may be plotted on the horizontal scale and the PSNR plotted on the vertical scale. The vertical PSNR scale may be dynamically adjusted. For example, when the current PSNR value exceeds a predetermined maximum value of the graph 174, the maximum value of the graph 174 may be increased to the next higher integer number of decibels. When the current PSNR value is less than a predetermined minimum value of the graph 174, the minimum value of the graph 174 may be decreased to a next lower integer number of decibels. Over the period of time displayed, the vertical scale of the graph may indicate the minimum and maximum PSNR reached since the decoder was started.

Referring to FIG. 8, a diagram illustrating an example legend window 156 is shown. The legend window generally provides information for interpreting a macroblock grid overlay in the main window 152. The macroblock parameters generally comprise macroblock type, sub-macroblock types and prediction directions. For example, the macroblock (MB) type generally specifies how a macroblock (e.g., a 16×16 block of video frame pixels) is partitioned (or segmented) and/or encoded. The MB types generally include, but are not limited to, Intra16×16, Intra4×4, Skip, Direct, Inter and PCM. The macroblock type information may be displayed with different shapes, shadings and/or colors. In one example, shapes and colors may be implemented as follows:

Intra16×16: Displayed as a solid square in a white color.
Intra4×4: Displayed as a grid of 4×4 solid squares in, for example, a white color.
Skip: Displayed as a transparent square with, for example, a red border.
Direct Displayed as a solid square in, for example, a light green color.
Inter The inter macroblock type may exist in a number of different sizes:
    16×16—contains one 16×16 block, displayed as a solid square,
    16×8—contains two 16×8 blocks, displayed as two solid rectangles,
    8×16—contains two 8×16 blocks, displayed as two solid rectangles, 8×8—contains four 8×8 macroblock sub-partitions, each sub-partition may be displayed in a square and may be one of the following types or sizes:
  Direct8×8 displayed as a small solid square in, for example, a light green color,
  Inter8×8 displayed as a small solid square,
  Inter8×4 displayed as two small rectangles,
  Inter4×8 displayed as two small rectangles,
  Inter4×4 displayed as four small squares.
PCM Displayed as a solid square in, for example, a yellow color.

The color-coding for inter predicted macroblocks (except for the Direct8×8 type) may, in one example, depend upon the prediction direction. Blocks coded in Inter16×16, Inter16×8, Inter8×16 macroblocks and all sub-partitions in Inter8×8 type (except for the Direct8×8 type) may be predicted using list0, list1 or both lists. The prediction list generally represents, which reference frame out of two choices (list0 and list1) is used to predict a bi-predictive macroblock or a sub-partition. In one example, all blocks predicted using list0 may be displayed in one color (e.g., red), all blocks predicted using list1 may be displayed in another color (e.g., blue color), and all blocks predicted using both list0 and list1 may be displayed in yet another color (e.g., purple color).

The legend window 156 may include symbols (e.g., lines) that may be used to indicate prediction direction. For example, a line may be displayed in each section of the macroblock grid indicating a motion vector direction (described in more detail in connection with FIG. 11). In one example, forward referenced vectors may be colored red and backward directed vectors may be colored blue.

Figure 9:
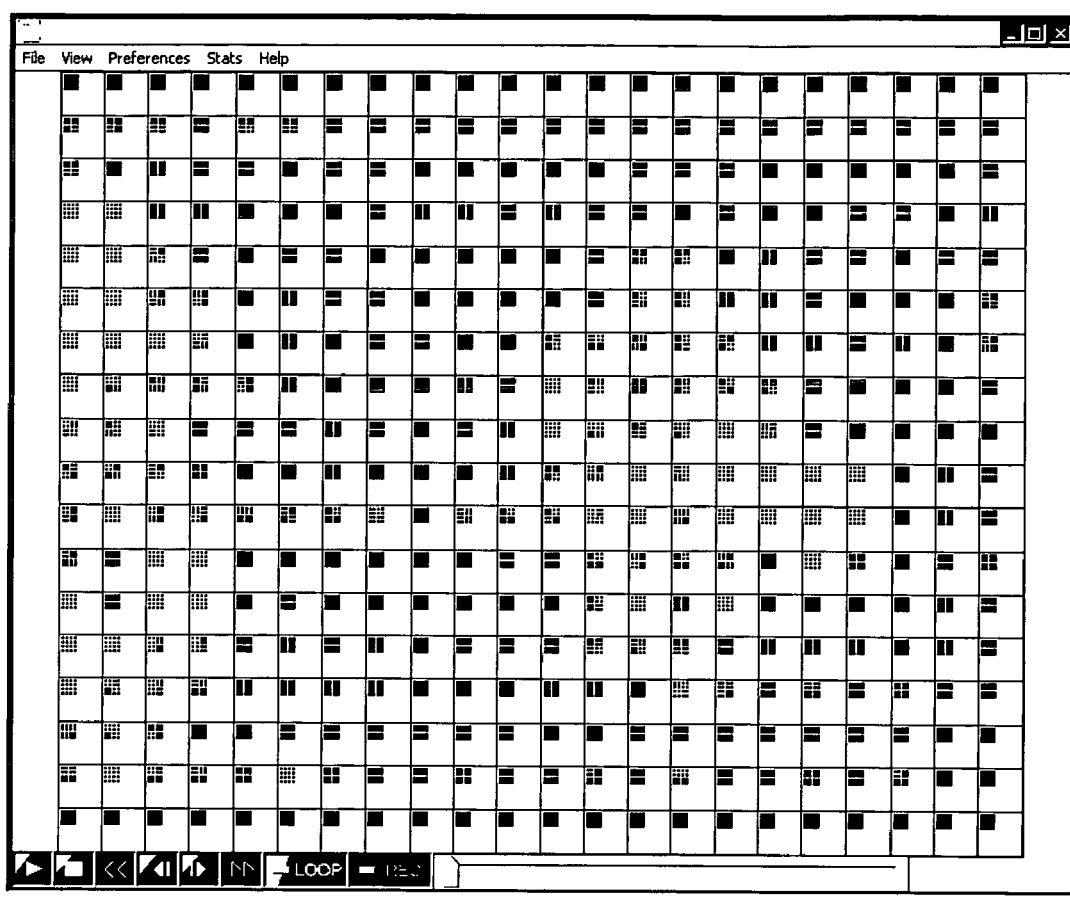
FIG. 9 is an example display illustrating an overlay containing graphic symbols representing macroblock partitioning information.

Referring to FIG. 9, a diagram illustrating an example of the window 152 presenting a macroblock grid overlay comprising macrboblock partition and encoding information is shown. Each square in the macroblock grid in the window 152 may include a graphic symbol representing the macroblock type information for the respective macroblock. The graphic symbols represent the partitioning and encoding information for a respective macroblock. The decoded video image is generally visible through the overlay, but has been omitted for clarity.

Referring to FIG. 10, a diagram illustrating an example of the window 152 presenting a macroblock grid overlay comprising a macroblock size parameter and a quantization parameter (QP) is shown. In one example, each macroblock grid element 180 may comprise a graphic element (or symbol) 182 and a graphic element or symbol) 184. The symbol 182 may represent the macroblock size parameter for the respective macroblock. The symbol 184 may represent the quantization parameter for the respective macroblock.

The macroblock size parameter 182 generally represents the number of bits used to encode the syntax elements of the macroblock. The macroblock size parameter may be displayed as a solid rectangle. In one example, the rectangle may be color coded (e.g., pink, etc.). The size of the rectangle may be representative of a relative size of the macroblock. The macroblock quantization parameter 184 for a macroblock may have a value, for example, in a range from 0 to 51. The macroblock quantization parameter may be displayed, in one example, as an integer number.

In one example, the size of the rectangle may be determined by the following example process:
  Set a pair of variables (e.g., min_mb_size and max_mb_size) to the minimum and maximum macroblock size, respectively, within the current picture.
  For all macroblocks in the current picture

```
{
    mb_size = getMBsize(curr_x, curr_y);
    square_size = 1.14 * sqrt((mb_size - min_mb_size) * 255
        / (max_mb_size-min_mb_size));
    DrawSquare(curr_x, curr_y, square_size);
}
```

However, other methods for determining the rectangle dimensions may be implemented accordingly to meet the design criteria of a particular application. The decoded video image is generally visible through the overlay, but has been omitted for clarity.

Referring to FIG. 11, a diagram illustrating an example of the window 152 presenting a macroblock grid overlay comprising reference index and motion vector information is shown. In one example, a macroblock grid element 190 may comprise a graphic element (or symbol) 192 and a graphic element (or symbol) 194. The symbol 192 may represent the reference index for the respective macroblock. The symbol 194 may represent one or more motion vectors for the respective macroblock.

The reference index 192 generally specifies the index of the reference frame that is used to predict a macroblock partition or sub-partition. At least one reference index is generally transmitted for every inter coded 16×16, 16×8, 8×16 block and every inter coded 8×8 sub-partition. In one example, the list0 reference index of the top-left block in a macroblock, if present in the bitstream, may be displayed as an integer number (e.g., 0, 1, etc.). The list1 reference indices may also be displayed accordingly.

In general, one or two motion vectors are transmitted for every block and every sub-partition block in an inter-predicted macroblock. The motion vectors may be displayed, in one example, as thin lines with the origin at the top-left corner of each macroblock grid element (e.g., the vector 194). In general, only the motion vector for the top-left block is displayed to avoid clutter. All motion vectors up to the 4×4 block size may be displayed, however, displaying too much information may make individual motion vectors indistinguishable. In one example, the top-left motion vector may be displayed to determine whether the true motion vector was detected and individual motion vectors may be displayed as numerical values in another location on the screen. The motion vector origin may be marked with a small dot. In one example, the list0 motion vectors may be displayed in a red color and the list1 motion vectors may be displayed in a blue color.

Figure 12:
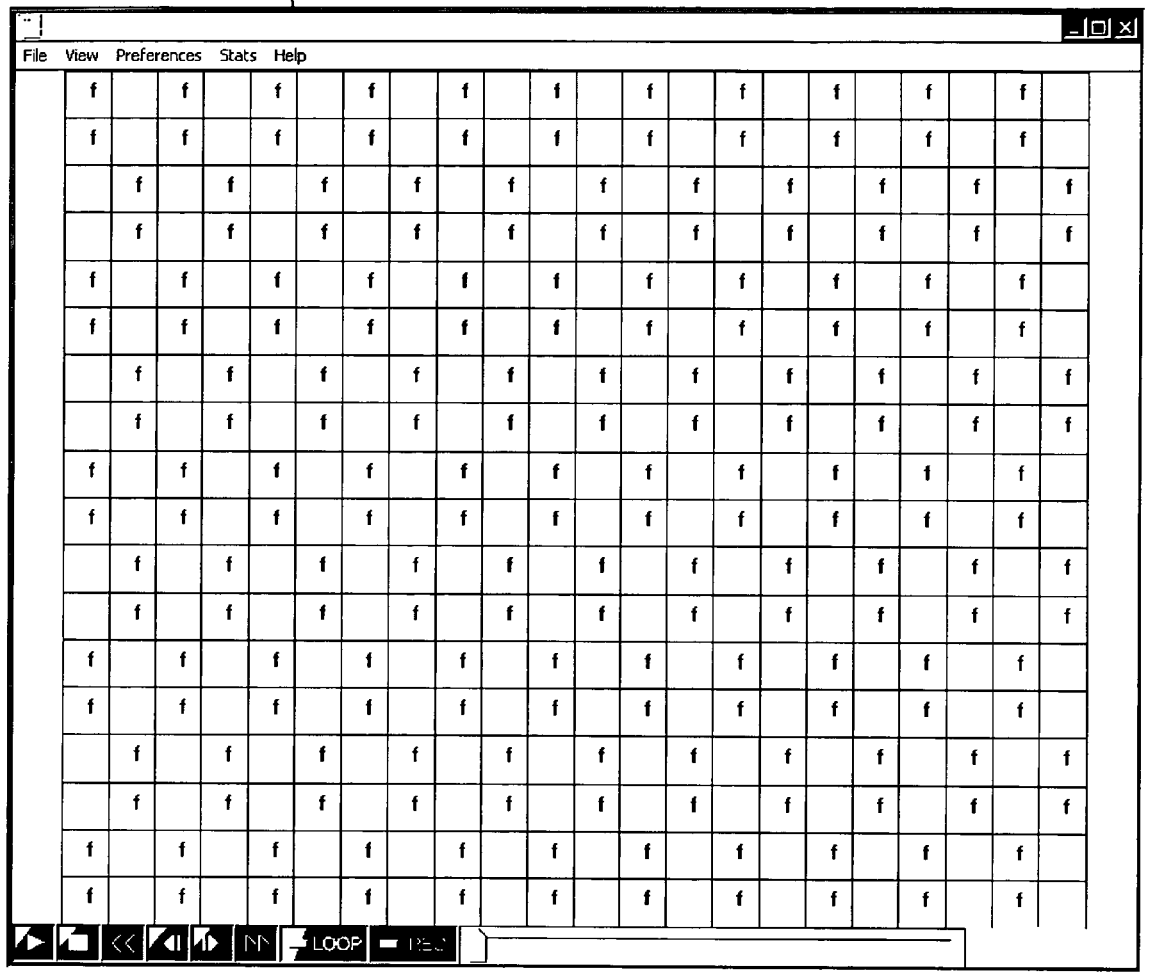
FIG. 12 is an example display illustrating an overlay image comprising information regarding MBAFF structure.

Referring to FIG. 12, a diagram illustrating an example of the window 152 configured to display macroblock level adaptive frame/field coding is shown. When macroblock level adaptive frame/field (MBAFF) coding is enabled, each macroblock pair may be coded in a frame or field mode. In one example, a lowercase letter (e.g., "f") may be displayed for all macroblocks coded in field mode, while nothing is displayed for macroblocks in frame mode. However, other symbols may be implemented accordingly to meet the design criteria of a particular application.

Various macroblock and image information may be displayed in separate windows. For example, referring to FIG. 13, the window 158 may present values of all pixels for one or more selected macroblocks. For example, luminance (Luma or Y) and both chrominance (Chroma or Cr and Cb) components may be displayed in separate areas of the window 158. In general, each value (e.g., Y, Cr, Cb) may be displayed as an unsigned 8-bit value.

In one example, a coded block pattern (CBP) window (not shown) may be implemented to display macroblock coded block patterns. The coded block pattern generally signals whether an 8×8 block within a macroblock has any coefficients. For example, for each macroblock, the luminance component generally has 4 8×8 blocks (e.g., L0, L1, L2, L3) and each chroma component in 4:2:0 format generally has one 8×8 block (e.g., Cb and Cr). In one example, the coded block pattern may be displayed in the following format:

L0L1L2L3 CdcCac where Cdc indicates a presence of any chroma DC coefficients and Cac indicates a presence of any chroma AC coefficients. A first symbol (e.g., "*") may be used to indicate blocks with any coefficients, while a second symbol (e.g., ".") may be used to indicate blocks with no coefficients. For example, a string ".." may indicate that luma blocks 0, 1 and 3 have coefficients presented, while there are no coefficients coded in the bitstream for luma block 2 and only chroma DC coefficients are presented in the bitstream. The coefficients for a selected macroblock may be displayed in a separate window in the same manner as the pixel values. In one example, only the coefficients of 8×8 blocks for which the CBP indicates the presence of any coefficients are generally displayed.

Referring to FIG. 14, a more detailed block diagram illustrating an example macroblock histogram 160 of FIG. 6 is shown. The macroblock histogram 160 generally comprises a histogram graph displaying the relative usage of different block types within a picture. In one example, the types of all 8×8 blocks may be used to create the histogram. The block types may be indicated by associated colors and/or shading. For example, a color coding may be implemented as follows:

| | |
|---|---|
| Intra16 × 16 | white |
| Intra4 × 4 | gray |
| Skip | light red |
| Direct | light green |
| Inter, list0 | red |
| Inter, list1 | blue |
| Inter, list0 and list1 | purple |
| PCM | yellow |

In one example, the width of a section of the histogram may represent the number of blocks of a particular type relative to all blocks in the image.

Referring to FIG. 15, a more detailed block diagram illustrating an example group-of-pictures histogram 162 of FIG. 6 is shown. The histogram 162 generally displays the type (e.g., I, B, P) and encoded size of each picture in a group-of-pictures sequence. The type information may be represented by shading and/or color. The encoded size may be represented by the height of each bar.

In one example, The window 152 may be implemented with a zoom and/or pan capability. For example, each macroblock in the macroblock grid overlay may be displayed using more than 16×16 pixels in the displayed area. By presenting each macroblock with a larger display area, more macroblock statistics may be drawn in the actual display area. In one example, the present invention may comprise software configured to use overlay hardware in PC video cards to display on-screen statistics in real-time. In general, the video picture may be upscaled first and then the grid and macroblock statistics may be rendered on top of the video picture.

The video presented by an H.264 decoder is generally in a YUV420 format. In order to display the video and the on-screen statistics on, for example, a PC monitor, the following steps may be performed:
 a) converting the video information from YUV to RGB;
 b) up-scaling the converted video information to a desired size and aspect ratio;
 c) rendering the on-screen statistics to the video picture;
 d) moving the created picture to a display memory of a video card.

In one example, the process may be repeated 30 times a second, for an NTSC video. However, other repeat rates may be implemented to meet the design criteria of a particular application (e.g., 25 times per second for SECAM or PAL).

The above steps may also be performed entirely in software. However, YUV to RGB conversion is generally CPU expensive and takes additional buffer space to store the RGB data. Good quality up-scaling is also very CPU expensive and may take an even larger buffer to store the up-scaled picture. The rendering of the on-screen statistics is generally performed for every picture since the previous picture is usually overwritten by the current one. The memory bandwidth used to move the video data to the video card may be substantial (e.g., 173 MB/s for a display with resolution 1600×1200).

In one example, an option may be implemented (e.g., in a menu screen not shown) for the on-screen statistics to be hidden (e.g., a mode with analyzer tools turned off). The various example overlays presented are shown as black on white for clarity. The text and graphic symbols may be implemented with opaque backgrounds and/or color coding configured to contrast with the decoded video image. The backgrounds of the text and graphic overlays displayed in the window 152 (e.g., FIGS. 9-12) may be configured to be transparent and may be replaced by the decoded video during playback, for example, using video overlay hardware.

Most of the video cards available for personal computers include special hardware called overlay hardware. The overlay hardware may significantly accelerate the steps listed above and offload most of the work from the CPU, which may already be used by a complex H.264 decoder. The overlay hardware is generally capable of (i) converting YUV data into RGB, (ii) up-scaling the video into almost any resolution and (iii) displaying the result in a settable destination area on the video display. The overlay hardware may perform the operations without any intervention from the system CPU. Another very useful feature of the overlay hardware is that the resulting picture generally does not overwrite the video memory. The picture is rather created on-the-fly as the memory is being read to drive the electron-beam. In one example, only specific pixels in the destination area are substituted with such a virtual picture.

The circuit 126 may be configured to setup the overlay hardware to transform the decoded video in YUV format to a destination rectangle in RGB format (e.g., the window 152) on the display and to specify which color in the destination rectangle to substitute with the overlay video. When a picture is decoded and ready to be displayed, the circuit 126 may wait for a vertical blanking interval before copying the picture to the source location of the overlay hardware. Waiting for the vertical blanking interval generally guarantees a flicker-free video playback.

A client area of an application implemented in accordance with the present invention is generally erased with the color used to setup the overlay hardware to display the decoded video. The decoder then uses the client area to display any statistics and the video playback will not overwrite the overlay. In general, once an image is drawn to the client area, the image stays there without a need for refreshing with every video picture while the video playback is running. In general, most of the statistics are updated less frequently than the video frame rate and the decoder application may update the statistics independently from the video playback minimizing the CPU usage.

When the present invention is displaying the macroblock level parameters in the analyzer mode, the display is generally updated in-sync with the decoded video to display the correct data for each picture. The number of graphical operations is generally significantly higher in this mode, because most of the client area of the decoder application is updated for every picture. However, the application generally does not put too much load on the CPU, because existing video cards generally have graphics accelerators. For example, the actual drawing into the video memory may be performed directly by the video card graphics accelerator rather than the system CPU. The graphics accelerator may send graphical commands to the video card minimizing both the CPU load as well as the memory bandwidth. The on-screen statistics may be updated in the vertical blanking interval for a flicker-free display. However, updating only during the vertical blanking interval is generally not necessary in most cases, because the on-screen statistics are generally updated infrequently and the change is usually very small so as not to produce noticeable flicker artifacts.

The present invention may make use of simple color-coded symbols, which are easy and fast to read, to display H.264 bitstream syntax elements as an overlay over the decoded video. The simultaneous display of both the decoded video and the H.264 bitstream syntax elements may significantly speed up codec (encoder/decoder), verification, and analysis of video bitstreams. The present invention may be used to also display syntax elements in previous and/or future encoding formats.

The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to generate a decoded video signal and syntax elements in response to an encoded bitstream; and
    a second circuit configured to generate one or more overlay images in response to said syntax elements, wherein (a) said one or more overlay images are displayed overlaying a corresponding decoded video image, (b) said one or more overlay images comprise one or more graphic symbols representing said syntax elements of said encoded bitstream and (c) said one or more overlay images comprise at least one image selected from the group consisting of
        (i) an image displaying statistics about said decoded video signal including resolution, frame rate, bit rate, a bit rate graph, bitstream errors, peak signal to noise ratio (PSNR), average PSNR and a PSNR graph, wherein one or more scales of said bit rate graph and said PSNR graph are dynamically adjusted to display minimum and maximum values,
        (ii) an image displaying a grid representing a number of macroblocks of said decoded video image, wherein for each macroblock a graphic symbol representing partitioning and encoding information for the respective macroblock is shown,
        (iii) an image displaying a grid representing a number of macroblocks of said decoded video image, wherein for each macroblock a graphic symbol representing a macroblock size parameter for the respective macroblock and a number representing a quantization parameter for the respective macroblock are shown, and
        (iv) an image displaying a grid representing a number of macroblocks of said decoded video image, wherein for each macroblock a graphic symbol representing a macroblock level adaptive frame/field (MBAFF) coding mode of the respective macroblock is shown.

2. The apparatus according to claim 1, wherein said second circuit is further configured to generate a main window configured to display said decoded video signal and said one or more overlay images, a statistics window, a legend window and a bit value window.

3. The apparatus according to claim 1, wherein said graphic symbols representing partitioning and encoding information for each respective macroblock comprise a square illustrating partitions of the respective macroblock.

4. The apparatus according to claim 1, wherein said graphic symbols representing partitioning and encoding information for each respective macroblock are color coded.

5. The apparatus according to claim 1, wherein said macroblock size parameter is displayed as a solid rectangle representing a number of bits used to encode syntax elements of the respective macroblock in said decoded video signal.

6. The apparatus according to claim 5, wherein a size of said solid rectangle represents a relative size of the respective macroblock in said decoded video image.

7. The apparatus according to claim 1, wherein said quantization parameter for each macroblock in said decoded video image is displayed as an integer value in a range from 0 to 51.

8. The apparatus according to claim 1, wherein said graphic symbols representing a macroblock level adaptive frame field (MBAFF) coding mode of each respective macroblock comprise a lower case letter to represent a field mode.

9. The apparatus according to claim 1, further comprising a compositing circuit configured to generate a composite video signal in response to said decoded video signal and said one or more overlay images.

10. The apparatus according to claim 1, wherein said first circuit is configured to convert from a YUV format to an RGB format and upscale said decoded video signal to a desired size and aspect ratio.

11. The apparatus according to claim 9, wherein said compositing circuit is configured to store said composite decoded video signal in a picture memory of a video card.

12. The apparatus according to claim 1, wherein said encoded bitstream comprises an H.264 compliant bitstream.

13. The apparatus according to claim 1, wherein said second circuit is further configured to generate all four images of said group and each of the images of said group is displayed in response to selection via a graphical user interface (GUI).

14. An apparatus comprising:
means for generating a decoded video signal and syntax elements in response to encoded bitstream; and
means for generating one or more overlay images in response to said syntax elements, wherein (a) said one or more overlay images are displayed overlaying a corresponding decoded video image, (b) said one or more overlay images comprise one or more graphic symbols representing said syntax elements of said encoded bitstream and (c) said one or more overlay images comprise at least one image selected from the group consisting of
(i) an image displaying statistics about said decoded video signal including resolution, frame rate, bit rate, a bit rate graph, bitstream errors, peak signal to noise ratio (PSNR), average PSNR and a PSNR graph, wherein one or more scales of said bit rate graph and said PSNR graph are dynamically adjusted to display minimum and maximum values,
(ii) an image displaying a grid representing a number of macroblocks of said decoded video image, wherein for each macroblock a graphic symbol representing partitioning and encoding information for the respective macroblock is shown,
(iii) an image displaying a grid representing a number of macroblocks of said decoded video image, wherein for each macroblock a graphic symbol representing a macroblock size parameter for the respective macroblock and a number representing a quantization parameter for the respective macroblock are shown, and
(iv) an image displaying a grid representing a number of macroblocks of said decoded video image, wherein for each macroblock a graphic symbol representing a macroblock level adaptive frame/field (MBAFF) coding mode of the respective macroblock is shown.

15. A method for analyzing a decoded video signal comprising the steps of:
generating a decoded video signal and syntax elements in response to encoded bitstream; and
generating one or more overlay images in response to said syntax elements, wherein (a) said one or more overlay images are displayed overlaying a corresponding decoded video image, (b) said one or more overlay images comprise one or more graphic symbols representing said syntax elements of said encoded bitstream and (c) said one or more overlay images comprise at least one image selected from the group consisting of
(i) an image displaying statistics about said decoded video signal including resolution, frame rate, bit rate, a bit rate graph, bitstream errors, peak signal to noise ratio (PSNR), average PSNR and a PSNR graph, wherein one or more scales of said bit rate graph and said PSNR graph are dynamically adjusted to display minimum and maximum values,
(ii) an image displaying a grid representing a number of macroblocks of said decoded video image, wherein for each macroblock a graphic symbol representing partitioning and encoding information for the respective macroblock is shown,
(iii) an image displaying a grid representing a number of macroblocks of said decoded video image, wherein for each macroblock a graphic symbol representing a macroblock size parameter for the respective macroblock and a number representing a quantization parameter for the respective macroblock are shown, and
(iv) an image displaying a grid representing a number of macroblocks of said decoded video image, wherein for each macroblock a graphic symbol representing a macroblock level adaptive frame/field (MBAFF) coding mode of the respective macroblock is shown.

16. The method according to claim 15, wherein said macroblock size parameter represents the number of bits used to encode the syntax elements of the macroblock.

17. The method according to claim 15, wherein said macroblock size parameter is displayed as a solid rectangle.

18. The method according to claim 17, wherein said rectangle is color coded.

19. The method according to claim 17, wherein a size of the solid rectangle is representative of a relative size of the corresponding macroblock.

20. The method according to claim 17, wherein the size of the solid rectangle is determined relative to a minimum macroblock size and a maximum macroblock size within said decoded video image.

21. The method according to claim 15, wherein said quantization parameter for the respective macroblock has a value in a range from 0 to 51.

22. The method according to claim 15, wherein said quantization parameter is displayed as an integer number.

* * * * *